J. P. CRAMER.
Cultivator-Teeth.
No 16,364.  Patented Jan. 6, 1857.
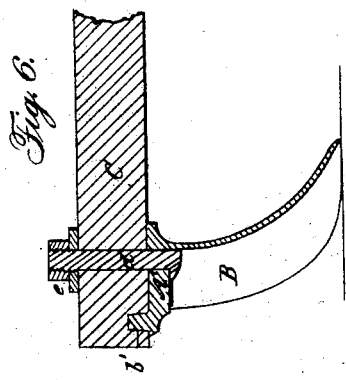
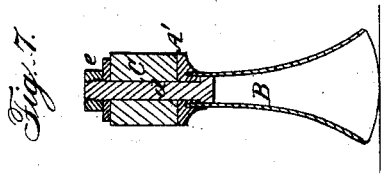
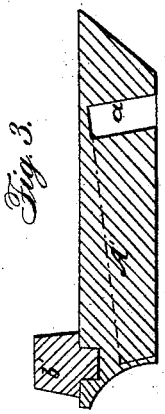
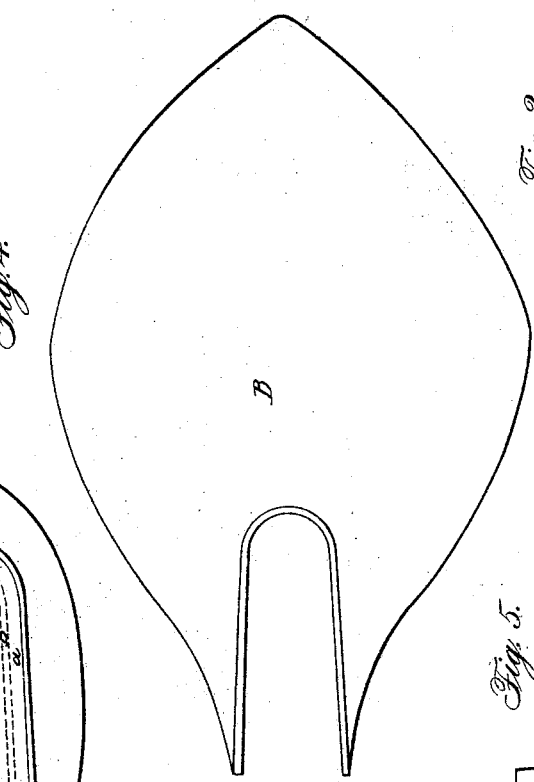
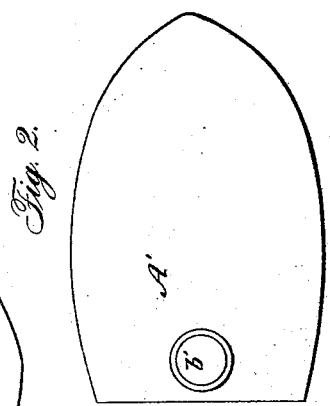
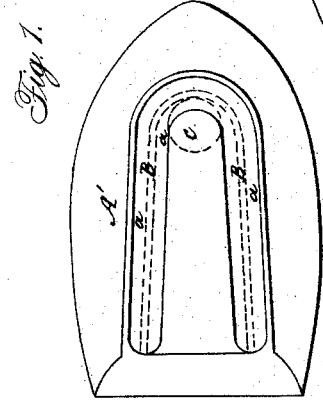
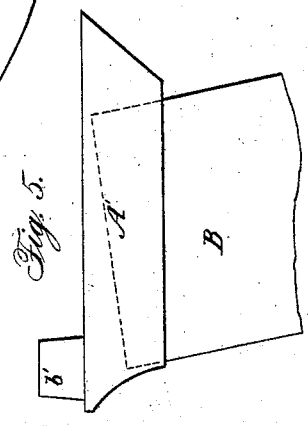

UNITED STATES PATENT OFFICE.

JAMES P. CRAMER, OF SCHUYLERVILLE, N. Y., ASSIGNOR TO HIRAM CRAMER.

IMPROVEMENT IN CULTIVATOR-TEETH.

Specification forming part of Letters Patent No. 16,364, dated January 6, 1857.

*To all whom it may concern:*

Be it known that I, JAMES P. CRAMER, of Schuylerville, in the county of Saratoga and State of New York, have invented a new and Improved Cultivator-Tooth; and I do hereby declare that the following is a full and exact description thereof, reference being had to the accompanying drawings, making part of this specification.

Figure 1 is a bottom view of the pattern of the cast-iron head of the tooth, and representing the manner of molding it with the shank of the tooth; Fig. 2, a top view of the pattern, and Fig. 3 a longitudinal vertical section through the center thereof; Fig. 4, a top view of the sheet-metal piece comprising the shank and blade of the tooth; Fig. 5, a side view of the cast-iron head, with the upper portion of the shank of the tooth; and Figs. 6 and 7, respectively, longitudinal and transverse sections of a tooth attached to the beam of a cultivator.

Like letters designate corresponding parts in all the figures.

The nature of my invention consists in the production of a new manufacture—to wit: an improved cultivator-tooth composed of a properly-shaped sheet-metal blade and shank, with an iron head cast upon the shank and embracing its outer and inner surfaces in such a manner that the said blade, shank, and head of the tooth will form but a single piece, substantially as hereinafter set forth.

The part B, comprising the blade and shank of the tooth, is made of a single piece of sheet metal, (generally of a thin steel plate,) and formed upon a suitable die into the ordinary shape in the bottom or blade portion, and of a U shape in the top or shank portion, as represented in the drawings. It is then molded together with a suitable pattern, A, Figs. 1, 2, and 3, for casting upon its shank the head A', Figs. 5, 6, and 7, subtantially of the form represented. The proper manner of molding will readily suggest itself to any one skilled in the art. The said pattern, formed with a groove, *a*, Figs. 1 and 3, for receiving the shank of the tooth, as shown by the red lines B B, Fig. 1, is molded therewith, and then having been withdrawn, the sand which filled the space around the shank in the groove *a* is blown out and a core inserted between the lips of the shank in the position indicated by the red line *c*, Fig. 1, in order to produce a hole through the cast head A', whereby to secure the tooth to the beam of the cultivator. The piece *b'* of the pattern is used for the purpose of forming a dowel-pin on the head A' to hold the tooth firmly in place on the beam of the cultivator.

Fig. 5 is a full-sized side view of the head and portion of the shank cast together, showing by dotted lines how far the shank is inserted in the cast-iron head, and the angle at which they are united. The head will be found to be, as it were, welded to the shank, so that the two parts form in effect one inseparably-connected piece. Thus formed the tooth is readily attached to the beam C of the cultivator by simply boring a hole of sufficient depth to receive the dowel-pin *b'* for keeping the tooth in the proper position, and another vertical hole through the beam, in which a bolt, *d*, passing also up through the hole cast in the head A', is inserted and secured therein by a nut, *e*, as represented in Figs. 6 and 7.

The superiority of a tooth constructed in the above-described manner consists, first, in the smaller amount of steel required than if the whole shank were made of the same material; secondly, in requiring not nearly so heavy cultivator-beams; but principally in the much greater simplicity and ease with which it can be secured to the beam of the cultivator, since with the sheet-metal shank a doubly oblique aperture is required to be made in the beam C, demanding greater skill and better tools to perform than farmers generally possess; but my improved tooth any one with a single auger of the proper size can in a few minutes attach to the beam in a perfect manner.

What I claim as my invention, and desire to secure by Letters Patent as a new manufacture, is—

My improved cultivator-tooth, composed of a properly-shaped sheet-metal blade and shank, with an iron head cast upon the shank, and embracing its outer and inner surfaces in such a manner that the said blade, shank, and head of the tooth will form but a single piece, substantially as herein set forth.

The above specification of my improved cultivator-tooth signed and witnessed this 26th day of January, 1854.

JAS. P. CRAMER.

Witnesses:
Z. C. ROBBINS,
J. S. BROWN.